Nov. 2, 1965   H. J. MODREY ETAL   3,215,027
FASTENER WITH SPRING BIASED WEDGES
Filed Feb. 8, 1962   2 Sheets-Sheet 1
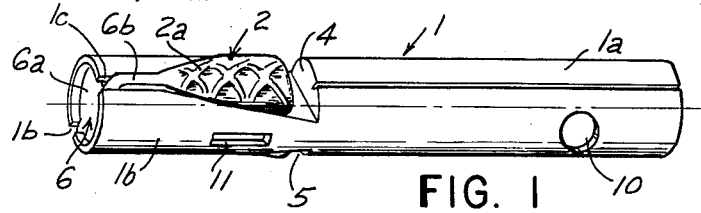
FIG. 1
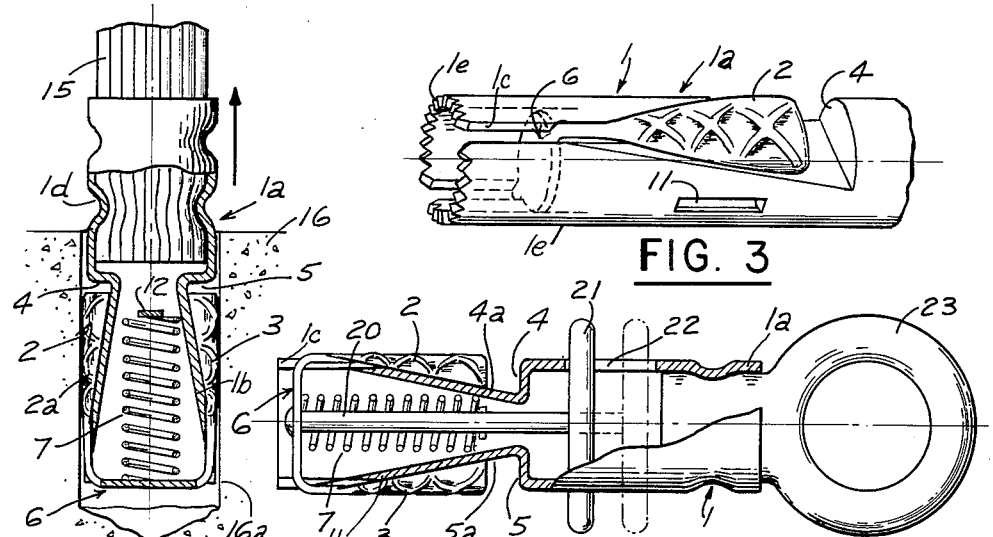
FIG. 2   FIG. 3
FIG. 4
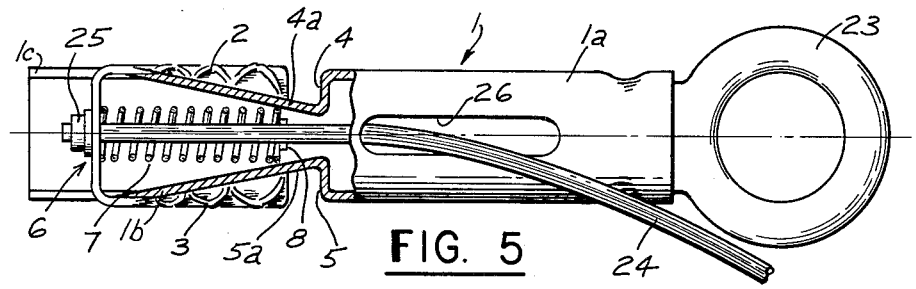
FIG. 5
INVENTORS
HENRY J. MODREY
LESTER LERICK
BY
Hane and Nydick
ATTORNEYS Nov. 2, 1965    H. J. MODREY ETAL    3,215,027
FASTENER WITH SPRING BIASED WEDGES
Filed Feb. 8, 1962    2 Sheets-Sheet 2

INVENTORS
HENRY J. MODREY
LESTER LERICK
BY
Hane and Nydick
ATTORNEYS

3,215,027
FASTENER WITH SPRING BIASED WEDGES
Henry J. Modrey, 158 Eagle Drive, Stamford, Conn., and Lester Lerick, P.O. Box 311, Broomfield, Colo.
Filed Feb. 8, 1962, Ser. No. 171,940
1 Claim. (Cl. 85—79)

This invention relates to a fastener for anchoring in an opening of a body to lift the same, or for joining two members to each other. More particularly, the invention relates to a fastener of the kind in which anchoring or locking of the fastener in a body opening or securing of the fastener to a member to be joined is effected by anchor members of the fastener which are forced into locking pressure engagement with a wall portion of the body or member to which the fastener is applied, by a pull force acting upon the fastener and tending to separate the fastener from the body or member to which it is locked. This pressure engagement supplies the locking or anchoring force and becomes the stronger the load is which acts upon the fastener.

It is a broad object of the invention to provide a novel and improved fastener of the general kind above referred to which upon insertion in a body opening or attachment to a member to be joined locks itself in position.

It is also a broad object of the invention to provide a novel and improved fastener of the general kind above referred to which can be conveniently released from the body or member to which it has been locked.

The aforementioned features of the fastener according to the invention render the fastener highly suitable to lift and transport light or heavy loads, such as stones, concrete blocks, castings, pipes, etc. The fastener, according to the invention, may further be advantageously used to join pipes or tubing, or to lock together mechanically and electrically the engaging and receiving parts of an electrical connector.

A specific object of the invention is to provide a novel and improved fastener of the general kind above referred to, the anchor members of which automatically move into a retracted or non-locking position when the fastener is pushed into a body opening or fitted into a member to be joined, thus permitting a convenient insertion of the fastener, but are continuously urged into the locking position by a spring force resisting any pull force tending to dislodge the fastener from its locked position.

Another more specific object of the invention is to provide a novel and improved fastener of the general kind above referred to which is capable of drilling or at least deepening a body opening for insertion of the fastener by acting in the manner of a drill.

Still another specific object of the invention is to provide a novel and improved fastener of the general kind above referred to which includes release means by which the anchoring members may be moved from the locking position into the release position and which are readily accessible when the fastener is locked in a body opening or to a member to be joined.

It is also a specific object of the invention, allied with the next preceding one, to provide release means by which several fasteners may be released simultaneously. Such simultaneous release of several fasteners is particularly useful, for instance, in connection with mining operations, with operations in quarries, or with the handling of heavy and bulky loads which may require the simultaneous use of several fasteners.

A further specific object of the invention is to provide a novel and improved fastener in the form of a pipe coupling, one part of which is integral with or secured to one end of one pipe and mounts the anchor members. Upon insertion of the fastener into the end of a second pipe the fastener will automatically lock itself to the second pipe in the same manner as in a body opening. This coupling may be designed as a one-sided coupling or as a double-sided coupling for use as a joint between two pipes.

A still further object of the invention is to provide a novel and improved fastener in the form of a two-part electrical connector, one member of which mounts the anchor members and the other member of which is comprised of a sleeve in which the anchor members are received and locked. The pole elements of the connector are accommodated within the connector members insulated from and shielded by wall portions of the members.

Other and further objects, features and advantages of the invention will be pointed out hereinafter and set forth in the appended claim.

Several preferred embodiments of the invention are shown in the accompanying drawing by way of illustration and not by way of limitation.

In the drawing:

FIG. 1 is a perspective view of a fastener according to the invention.

FIG. 2 is a sectional view of a modification of the fastener locked in an opening of a body.

FIG. 3 is a perspective view of another modification of the fastener designed for use as a drill.

FIG. 4 is a sectional view of a fastener according to the invention including release means.

FIG. 5 is a sectional view of a fastener showing a modification of the release means.

Figure 6:
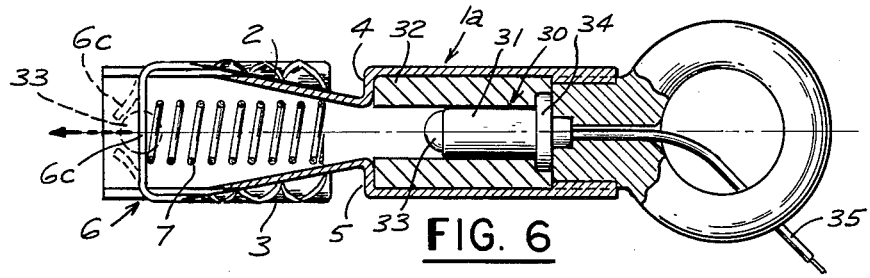
FIG. 6 is a sectional view of a fastener showing a further modification of the release means.

Referring now to the figures in detail, the fastener as shown in all the figures comprises a mounting bolt 1 and two anchor members 2 and 3 which are disposed on the mounting bolt in diametrical opposition. However, it should be pointed out in this connection that in certain instances one anchor member may be sufficient whereas in other instances more than two anchor members may be preferable. The two anchor members are fitted lengthwise slidable in generally wedge-shaped indentations 4 and 5. These indentations are inwardly slanted from the near end of the mounting member towards the far end thereof. The bases 4a and 5a respectively of the indentations are flat and the engaging side of anchor members 2 and 3 is correspondingly shaped. The configuration of the anchor members is such that the outer peripheral outline of the anchor members is within the peripheral outline of the mounting member when the anchor members are in the retracted or release position but will slightly radially protrude from the peripheral outline of the mounting member when the anchor members are in the forward or locking position such as shown in FIG. 2. The outer or gripping surface of the anchor members is preferably formed with ridges or otherwise roughened to provide a good frictional grip between the anchor members and a surrounding wall portion. The two anchor members are joined by a bail 6 and a loaded coil spring 7 which is secured at one end to an appropriate lug 8 within the mounting bolt and abuts at the other end against bail 6 thereby urging the anchor members towards the forward or locking position.

Referring now to FIG. 1 in detail, the fastener as exemplified by that figure comprises a tubular mounting bolt which may be produced by blanking and rolling flat sheet material. The bolt comprises a mounting portion 1a and an anchor portion 1b. The aforedescribed indentations 4 and 5 are formed in the anchor portion of the bolt and the mounting portion constitutes a portion for securing the fastener to equipment by a means of which, a load to which the fastener may be locked, can be manipulated. Such means may be a thread rolled into the tube. In FIG. 1, there is shown, by way of example, a hole 10 punched through mounting portion 1a. A rope, a hook, a hoist or other suitable equipment may be extended through the hole. Bail 6 is shown as comprising a disc 6a slidably fitted in the respective open end of tube 1a. Arms 6b extending from the disc join the same to the tapered ends of the anchor members. The arms are slidably guided in lengthwise slots 1c formed in the leading end of anchor portion 1b. The stop for spring 7 is formed by a strip of wall material lanced out of mounting portion 1a as indicated at 11, but, of course, may be provided by any other suitable manner. The stop is shown more clearly in FIG. 2 as strip 12.

The fastener according to FIG. 2 is similar in principle and structure to that of FIG. 1 except that the mounting portion 1a of the fastener of FIG. 2 is shown as being attached to a wire rope 15 which is secured in the fastener bolt by crimping at 1d, or by any other suitable means. The fastener bolt of FIG. 2 may be a seamed tube, but seamless tube material is generally preferable if heavier loads are to be handled.

The operation of a fastener such as shown in FIGS. 1 and 2 is as follows:

Let it be assumed that the fastener is to be locked in a bore 16a of appropriate diameter formed in a body 16. This body may be visualized for instance as a concrete block. To lock the fastener to the body opening, the fastener is simply pushed with its forward end into the bore. During the insertion of the fastener the anchor members thereof, when and if coming into frictional engagement with the surrounding wall material, will be forced back towards the rear end of the fastener, that is deeper into the indentations, against the action of spring 7, thus permitting a convenient insertion of the fastener even if the bore is a comparatively narrow fit. After the fastener is pushed home, spring 7 will become effective to urge the anchor members in the forward direction and into a slightly radially protruding position sufficient to bring the anchor members into frictional engagement with the surrounding wall material. The resulting frictional engagement between the anchor members and the surrounding wall material does not and is not intended to constitute an anchoring force sufficient to lock the fastener in the bore against a strong outward pull, but it is sufficient to render the anchoring members substantially stationary in reference to the surrounding wall material and bolt 1. If now a pull is applied to rope 15 in the direction of the arrow, for instance when it is attempted to lift the concrete block 16, the bolt will be slightly retracted from the bore in reference to the anchor members and as a result the anchor members will be clamped between the surrounding wall material and the slanted surfaces of the indentations. It is this clamping pressure due to the slight retraction of the bolt which supplies the anchoring force, and as it is evident the anchoring force will be the stronger, the heavier the pull which is applied to wire rope 15.

The locking assembly of the fastener shown in FIG. 3 is the same as the locking assembly of the fastener shown in FIG. 1 or 2. The fastener of FIG. 3 is distinguished from the previously described fasteners in that the slotted edge 1e of the fastener is provided with cutting teeth or otherwise serrated so that the respective end of the fastener constitutes in effect a crown drill. As a result, the fastener of FIG. 3 is capable of drilling its own mounting hole, or deep ending a pre-drilled mounting hole by inserting the fastener in a suitable rotary power tool.

The fastener according to FIG. 4 employs the same locking mechanism as hereinbefore described. However, while the fasteners as shown in FIG. 1, 2 and 3 cannot be withdrawn after they have been locked in the opening of a body unless the mounting hole is extended through the thickness of block 16, the fastener of FIG. 4 is equipped with release means on the load side. These release means are shown as comprising a release member in the form of a pull rod 20 secured at one end to the disc of bail 6 and at the other end of an actuating member in the form of a grip 21. Grip 21 protrudes from lengthwise slots 22 in the mounting portion of tube 1a. As is evident and as is indicated by dotted lines, withdrawal of grip 21 from the full line position into the dotted line position will release the pressure engagement between the anchor members and the surrounding wall material, thereby permitting retraction of the fastener from a body opening in which it is locked.

The length of slots 22 is such that when a grip 21 engages the left-hand forward end of slots 22 and is thus in its most forward position, the arms 6b remain guided in slots 1c.

The mounting portion of tube 1a is shown as being crimped to an eyebolt 23, but it may of course also be crimped to a wire rope, or the mounting portion may have a thread or a mounting hole such as shown in FIG. 1.

The fastener of FIG. 5 is also equipped with release means. These release means are shown as comprising a flexible wire 24 secured at one end to bail 6 by suitable fastening means 25 and extending from tube 1a through a slot 26. As is evident, a pull on wire 24 will break the locking grip between the anchor members and the surrounding wall material.

FIG. 6 shows a fastener equipped with release means which are particularly suitable when it is desired to release several fasteners simultaneously. The locking mechanism of the fastener is the same in principle as has been previously described, but the disc 6a of bail 6 is preferably replaced by a comparatively narrow strip 6c for a reason which will be subsequently explained.

The release means according to FIG. 6 comprise a firing mechanism 30 aimed at bail strip 6c. The firing mechanism comprises a casing 31 containing a suitable propellant of a conventional type. Casing 31 is preferably located in tube 1a by means of a guide sleeve 32 of any suitable material. The propellant in casing 31, when ignited, acts upon a projectile 33. Ignition of the propellant is effected by means of a detonator 34 of conventional design or by a pin firing mechanism. The detonator and, more specifically, the primer thereof are electrically controlled in a conventional manner as is indicated by a wire 35. As it is readily apparent, any number of firing mechanisms can be connected and thus simultaneously activated. Upon activation of the firing mechanism, projectile 33 will hit and break bail strip 6c as is indicated in dotted lines. As a result, spring 7, which in the embodiment of FIG. 6, does not abut against a special spring stop but against a constricted portion of the anchor portion, can no longer exert upon the anchor members a force urging the same into the locking position. Such release of the spring force is sufficient to loosen the anchor members thereby permitting retraction of the fastener from its mounting opening.

Figure 7:
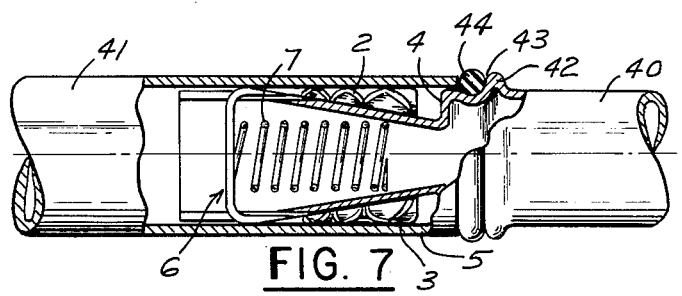
FIG. 7 is a sectional view of a fastener according to the invention in the form of a one-sided pipe coupling.

FIG. 7 shows a fastener in the form of a pipe coupling for coupling pipes 40 and 41. One end of one of the pipes, pipe 40 in the figure, is formed with the aforedescribed indentations 5 and 6 and mounts anchor members 2 and 3 joined by bail 6 and biased by spring 7. One end of the spring abuts in FIG. 7 against a constriction formed in pipe 40 rather than against a spring stop such as has been described in FIGS. 1 and 5.

The function of the locking mechanism provided on pipe 40 is apparent from the previous description. It suffices to state that when the locking mechanism is inserted in the respective end of pipe 41 which corresponds in function to a body opening such as shown in FIG. 2, pipe 40 will lock itself within pipe 41.

To effect a seal between pipes 40 and 41 a peripheral collar 42 and a peripheral groove 43 are provided on pipe 40. An elastic sealing ring 44 is inserted in groove 43 and is engaged with pressure engagement by the respective edge of pipe 41 when the two pipes are coupled.

Figure 8:
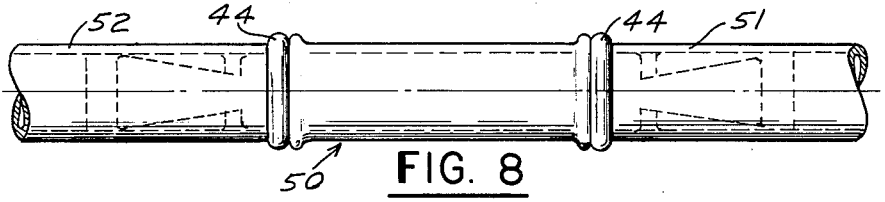
FIG. 8 is a view of a pipe coupling of the kind shown in FIG. 7 but designed as a double-sided pipe coupling.

FIG. 8 shows an arrangement in which the fastener mechanism according to the invention is utilized to form a pipe joint 50 by means of which pipes 51 and 52 may be coupled. Pipe joint 50 has at both ends a locking mechanism as described in connection with pipe 40 of FIG. 7. The function of the locking mechanism is evident from the description of FIG. 7.

Figure 9:
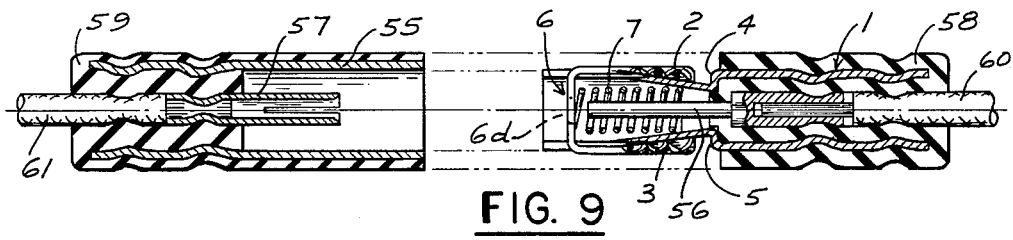
FIG. 9 is a sectional view of a fastener according to the invention in the form of an electrical connector.

FIG. 9 shows the use of a fastener according to the invention as part of an electrical connector. For this purpose the mounting member 1 is formed with the previously described indentations 4 and 5 and mounts anchor members 2 and 3 joined by bail 6 and biased by spring 7. The locking assembly coacts with a sleeve 55 in which it locks itself when inserted therein in the manner previously described.

An engaging pole element 56 is mounted lengthwise in mounting member 1 and a receiving pole element 57 is mounted lengthwise in sleeve 55. Pole element 56 is insulated from the mounting member by a molded rubber sleeve 58 in which the mounting member is embedded. Similarly, pole member 57 is insulated from sleeve 55 by a rubber sleeve 59 in which is embedded sleeve 55. The pole elements are secured to wires 60 and 61, for instance, by crimping. As is evident, the connector part including mounting member 1 constitutes functionally the plug of the connector and the connector part including sleeve 55 constitutes the receptacle of the connector. When the plug and the receptacle are pushed together for locking engagement the pole elements will engage each other. To permit passage of pole element 56 through bail 6, the latter is provided with an aperture 6$^d$.

The connector as shown establishes a permanent connection between the two wires once the connector parts are locked to each other, but if desired, release means of the kind shown in FIGS. 4 and 5 may be provided. The fastener in FIG. 2 may also be used as an electrical connector if inserted into a conductive tube. This arrangement is suitable for grounding heavy cables to metal structures.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claim.

What is claimed as new and desired to be secured by Letters Patent is:

An expansion fastener for anchoring in a mounting opening in a body, said fastener comprising a tubular bolt member having a leading anchor portion and a trailing mounting portion, said anchor portion including a pair of circumferentially spaced generally wedge-shaped lengthwise extending indentations outwardly tapered toward the leading end of said anchor portion and a pair of lengthwise slots extending from the leading ends of said indentations to the leading end of said anchor portion, a generally wedge-shaped anchor member loosely fitted in each of said indentations slidable along the same between a retracted release position in which the respective anchor member is substantially within the peripheral outline of said anchor portion and a forward locking position in which the respective anchor member radially protrudes from said peripheral outline for locking engagement with a wall portion defining the mounting hole in said body, a U-shaped bail joined with its arms to the leading ends of said anchor means and extending with its bight across the leading end of the anchor portion, the arms of said bail engaging said slots for guidance therein, a loaded spring within said anchor portion abutting at one end against said bight and at the other end against an inner wall part of the anchor portion to urge said anchor members conjointly with the bail toward the locking position, and release means coacting with said anchor members for withdrawing the same from said locking position into said release position against the action of said spring, said release means including a lengthwise elongated slot in the mounting portion, an elongated release member within said anchor portion and an actuating member extending into said slot of the mounting portion transversely thereto, one end of said release member being secured to said bight and the other end to said actuating member for retracting said anchor members toward the release position against the action of said spring, the leading end of the slot in the mounting portion limiting the forward movement of the actuating member due to the action of said spring to a position in which the arms of the bail remain engaged with said slots in the anchor position.

References Cited by the Examiner
UNITED STATES PATENTS

| | | | |
|---|---|---|---|
| 2,028,328 | 1/36 | Herold | 85—2.8 |
| 2,774,273 | 12/56 | Olson | 85—2.4 |
| 2,918,840 | 12/59 | Roesler | 85—2.4 |
| 3,079,829 | 3/63 | Chester | 85—5 |

EDWARD C. ALLEN, *Primary Examiner.*

JOSEPH D. SEERS, *Examiner.*